United States Patent Office 3,419,571
Patented Dec. 31, 1968

3,419,571
METHOD FOR RELIEVING CORONARY INSUFFICIENCY
Frederick J. Di Carlo, Mountain Lakes, N.J., assignor to Warner-Lambert Pharmaceutical Company, Morris Plains, N.J., a corporation of Delaware
No Drawing. Filed Apr. 6, 1966, Ser. No. 540,500
1 Claim. (Cl. 424—298)

ABSTRACT OF THE DISCLOSURE

A novel method for relieving coronary insufficiency by the administration of pentaerythritol lower nitrates.

---

This invention relates to a method for relieving coronary insufficiency. More particularly, this invention relates to a method for relieving coronary insufficiency by the administration of pentaerythritol lower nitrates.

An object of this invention is to provide a method for relieving coronary insufficiency by the oral administration of pentaerythritol lower nitrates which are described below.

A further object of this invention is to provide a sustained method for the relief of coronary insufficiency.

An additional object is to provide rapid relief of coronary insufficiency.

Another object of this invention is to provide a method for the relief of coronary insufficiency by the administration of very small doses of lower nitrates of pentaerythritol at very infrequent intervals.

Other objects and advantages of this invention will become apparent from the following detailed description.

The term lower nitrates of pentaerythritol used herein embraces pentaerythritol mononitrate of the formula:

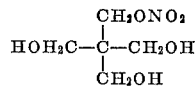

pentaerythritol dinitrate of the formula:

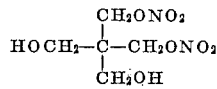

and pentaerythritol trinitrate of the formula:

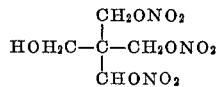

These lower nitrates of pentaerythritol are known compounds, the preparation of which are fully described in Chemical Abstracts 57 (1962) page 647. While these compounds are known as chemical entities, nothing was known heretofore about their biological activity. I have now discovered that these lower nitrates of pentaerythritol are effective agents for the relief of coronary insufficiency.

The tetranitrate of pentaerythritol has been found to have coronary vasodilator activity. However, these lower nitrates produce a significantly greater increase in coronary blood flow at a much lower dose level. In addition, their activity in the animal body is significantly longer. Accordingly, these lower nitrates may be used to treat ailments associated with coronary insufficiency at a very low dose level and at infrequent intervals.

The compositions of this invention are preferably prepared by mixing together one of the above lower nitrates pentaerythritol with a suitable diluent such as lactose or mannitol to reduce the explosive liability in a ratio such as 1 part active ingredient to 9 parts diluent. The resulting mixture is then mixed with other pharmaceutical adjuvants to form suitable dosage forms. Compositions suitable for oral administration are the known pharmaceutical forms for such administration; e.g., pressed or coated tablets and capsules. Suitable oral compositions include tablets wherein the active ingredient diluted with lactose or mannitol is mixed with inert fillers; e.g., dicalcium phosphate, terra alba, in the presence of disintegrating agents, for example, maize starch, and in the presence of lubricating agents, for example, magnesium stearate, or suspensions in a nontoxic vegetable oil and the like.

These lower nitrates of pentaerythritol are administered orally to an animal suffering from coronary insufficiency in a dosage range of from about 0.1 mg./kg. to about 100 mg./kg., preferably about 1 mg./kg. to about 20 mg./kg. of animal body weight, with the particular dosage being adjusted to the species and to the requirements of the particular animal. In humans, for example, a dose of 1 to 5 mg. once or twice daily is desirable.

To enhance their therapeutic spectrum these lower nitrates of pentaerythritol may be combined with other therapeutic agents such as sedatives, for example, phenobarbitol; tranquilizers, for example, chlordiazepoxide, prazepam and cyprazepam; steroids such as 8-azasteroids; diuretics, for example, chlorothiazide and the like.

It is understood that the foregoing detailed description is given merely by way of illustration and that many variations may be made therein without departing from the spirit of my invention.

Having described my invention, what I desire to secure by Letters Patent is:

1. Method for relieving coronary insufficiency which comprises administering orally to a host afflicted with coronary insufficiency an effective amount of pentaerythritol trinitrate.

References Cited

UNITED STATES PATENTS 3,096,242  7/1963  Young _____ 167—65

RICHARD L. HUFF, *Primary Examiner.*